United States Patent
Kim et al.

(10) Patent No.: US 11,872,919 B2
(45) Date of Patent: Jan. 16, 2024

(54) SEAT HEADREST

(71) Applicants: Hyundai Motor Company, Seoul (KR); Kia Corporation, Seoul (KR); Hyundai Transys Inc., Seosan-si (KR); WOOBO TECH CO., LTD., Pyeongtaek-si (KR)

(72) Inventors: Seung Hyun Kim, Daejeon (KR); Seon Chae Na, Yongin-Si (KR); Byung Yong Choi, Hwaseong-Si (KR); Min Ju Lee, Hwaseong-Si (KR); Sang Hyun Lee, Anyang-Si (KR); Hyun Sung Kim, Hwaseong-Si (KR); Jin Mun Park, Hwaseong-Si (KR); Kyeong Hyun Lee, Hwaseong-Si (KR); Jae Sung Lee, Seoul (KR); Hae Il Jeong, Incheon (KR)

(73) Assignees: Hyundai Motor Company, Seoul (KR); Kia Corporation, Seoul (KR); Hyundai Transys Inc., Seosan-si (KR); Woobo Teck Co., Ltd., Pyeongtaeksi (KR)

( * ) Notice: Subject to any disclaimer, the term of this patent is extended or adjusted under 35 U.S.C. 154(b) by 26 days.

(21) Appl. No.: 17/728,835

(22) Filed: Apr. 25, 2022

(65) Prior Publication Data
US 2022/0396189 A1 Dec. 15, 2022

(30) Foreign Application Priority Data
Jun. 11, 2021 (KR) .................. 10-2021-0076139

(51) Int. Cl.
*B60N 2/818* (2018.01)
*B60N 2/894* (2018.01)
*B60N 2/897* (2018.01)

(52) U.S. Cl.
CPC ............. *B60N 2/818* (2018.02); *B60N 2/894* (2018.02); *B60N 2/897* (2018.02)

(58) Field of Classification Search
CPC ......... B60N 2/818; B60N 2/894; B60N 2/897
See application file for complete search history.

(56) References Cited

U.S. PATENT DOCUMENTS

| 10,434,915 | B2 * | 10/2019 | Wehling | B60N 2/818 |
| 2016/0166064 | A1 * | 6/2016 | Takahashi | B60N 2/809 |
| | | | | 297/391 |
| 2016/0250952 | A1 * | 9/2016 | Sasaki | B60N 2/815 |
| | | | | 297/410 |
| 2016/0288676 | A1 * | 10/2016 | Lelievre | B60N 2/829 |

FOREIGN PATENT DOCUMENTS

KR 10-1836794 3/2018

* cited by examiner

*Primary Examiner* — David R Dunn
*Assistant Examiner* — Tania Abraham
(74) *Attorney, Agent, or Firm* — MORGAN, LEWIS & BOCKIUS LLP

(57) ABSTRACT

A seat headrest includes: a pad assembly; a main cover surrounding a rear side of the pad assembly; an upper guide coupled to the main cover and provided with an upward/downward movement guide groove formed in the upper guide and elongated upward/downward; a post stay including an upper portion inserted in the upward/downward movement guide groove; and a post holding guide, in which the lower portion of the post stay is inserted and held and which is held to a seat back frame.

9 Claims, 9 Drawing Sheets

SEAT HEADREST

CROSS REFERENCE TO RELATED APPLICATION

The present application claims priority to Korean Patent Application No. 10-2021-0076139, filed Jun. 11, 2021, the entire contents of which is incorporated herein for all purposes by this reference.

BACKGROUND OF THE PRESENT DISCLOSURE

Field of the Present Disclosure

The present disclosure relates to a technology regarding a headrest of a seat mounted on a vehicle or the like.

Description of Related Art

A vehicle seat headrest is configured such that the position thereof may be adjusted in the upward/downward direction for user convenience.

According to the related art, two stay rods are configured to be able to move in the upward/downward direction with regard to a seatback frame and to be able to remain in a fixed position such that the position of the headrest may be adjusted.

The two stay rods for supporting the headrest with regard to the seatback are commonly made of a metal material different from that of the seatback or the headrest, to secure sufficient rigidity, and this tends to degrade the uniformity of the overall appearance of the seat.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a seat headrest configured such that the same is supported to be able to move in the upward/downward direction with sufficient rigidity with regard to a seatback, and parts configured to move the headrest in the upward/downward direction are harmonized with the overall appearance of the seat, securing a high-quality appearance of the seat.

In accordance with an aspect of the present disclosure, a seat headrest includes: a pad assembly; a main cover surrounding a rear side of the pad assembly; an upper guide coupled to the main cover and provided with an upward/downward movement guide groove formed in the upper guide and elongated upward/downward; a post stay including an upper portion inserted into the upward/downward movement guide groove; and a post holding guide in which a lower portion of the post stay is inserted and held and which is held to a seat back frame.

A plurality of notch grooves may be formed through the post stay in an upward/downward direction of the post stay, and the upper guide may be provided with a locking mechanism which is inserted into the notch grooves so that a state in which a position of the upper guide is held with respect to the post stay is configured to vary.

The locking mechanism may include: a lock plate bezel slidably provided in the upper guide in a direction perpendicular to a longitudinal direction of the post stay; a lock plate coupled to the lock plate bezel and configured to be selectively inserted into one of the notch grooves of the post stay; a spring provided to apply elastic force to the lock plate bezel in a direction in which the lock plate is inserted into the one of the notch grooves; and a release button provided on the upper guide so that a displacement in a direction in which the lock plate is separated from the one of the notch grooves is transferred to the lock plate bezel in response to a user's operation thereof.

The lock plate may be made of different types of material having rigidity stronger than the lock plate bezel and held to the lock plate bezel.

A garnish may be provided outside the upper guide to surround the upper guide, and the lower end portion of the garnish may be inserted in a lower guide portion formed on an upper portion of the post holding guide and configured to guide an upward/downward movement thereof.

The garnish may include: a front garnish surrounding a front side of the upper guide; and a rear garnish surrounding a rear side of the upper guide.

A top flange may be integrally formed on an upper end portion of the lower guide portion of the post holding guide to beautify the appearance of the upper end portion of the seat back.

The post stay may be configured to be held, when inserted into the post holding guide, in a direction perpendicular to a longitudinal direction of the post stay by the post holding guide and an omega spring inserted into the post stay.

A locking hook may be integrally provided at the lower portion of the post holding guide to hold the post holding guide to the seat back frame while being restored after elastic deformation when the post holding guide is inserted in the seat back frame.

According to an exemplary embodiment of the present disclosure, a seat headrest is configured such that the same is supported to be able to move in the upward/downward direction with sufficient rigidity with regard to a seatback, and parts configured to move the headrest in the upward/downward direction are harmonized with the overall appearance of the seat, securing a high-quality appearance of the seat.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
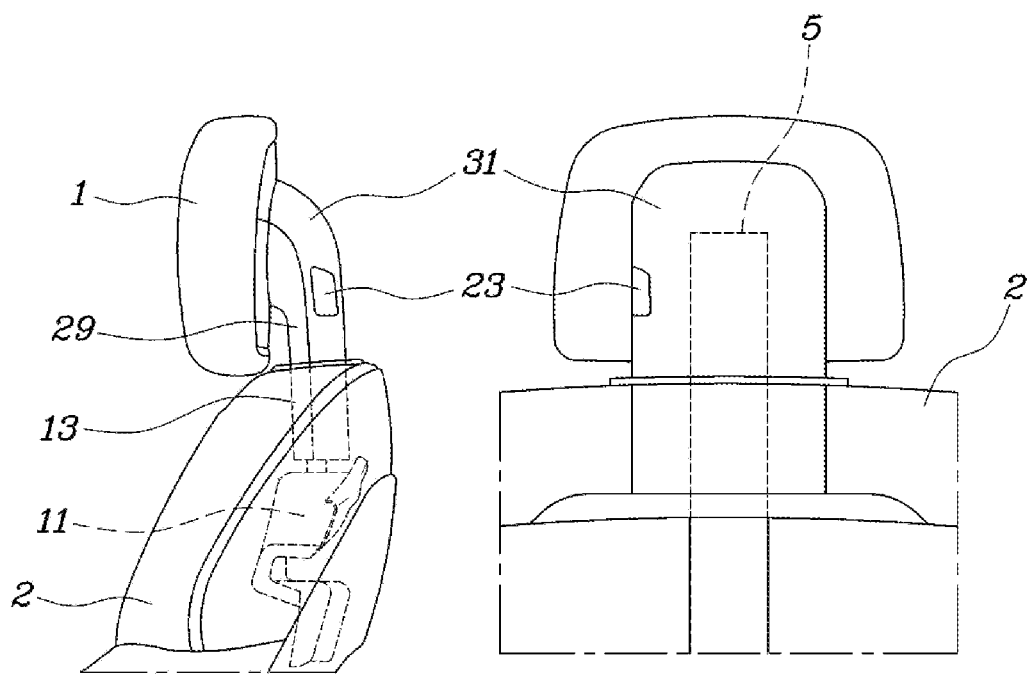
FIG. 1 is a view for explaining a structure of a seat headrest according to an exemplary embodiment of the present disclosure.
Figure 2:
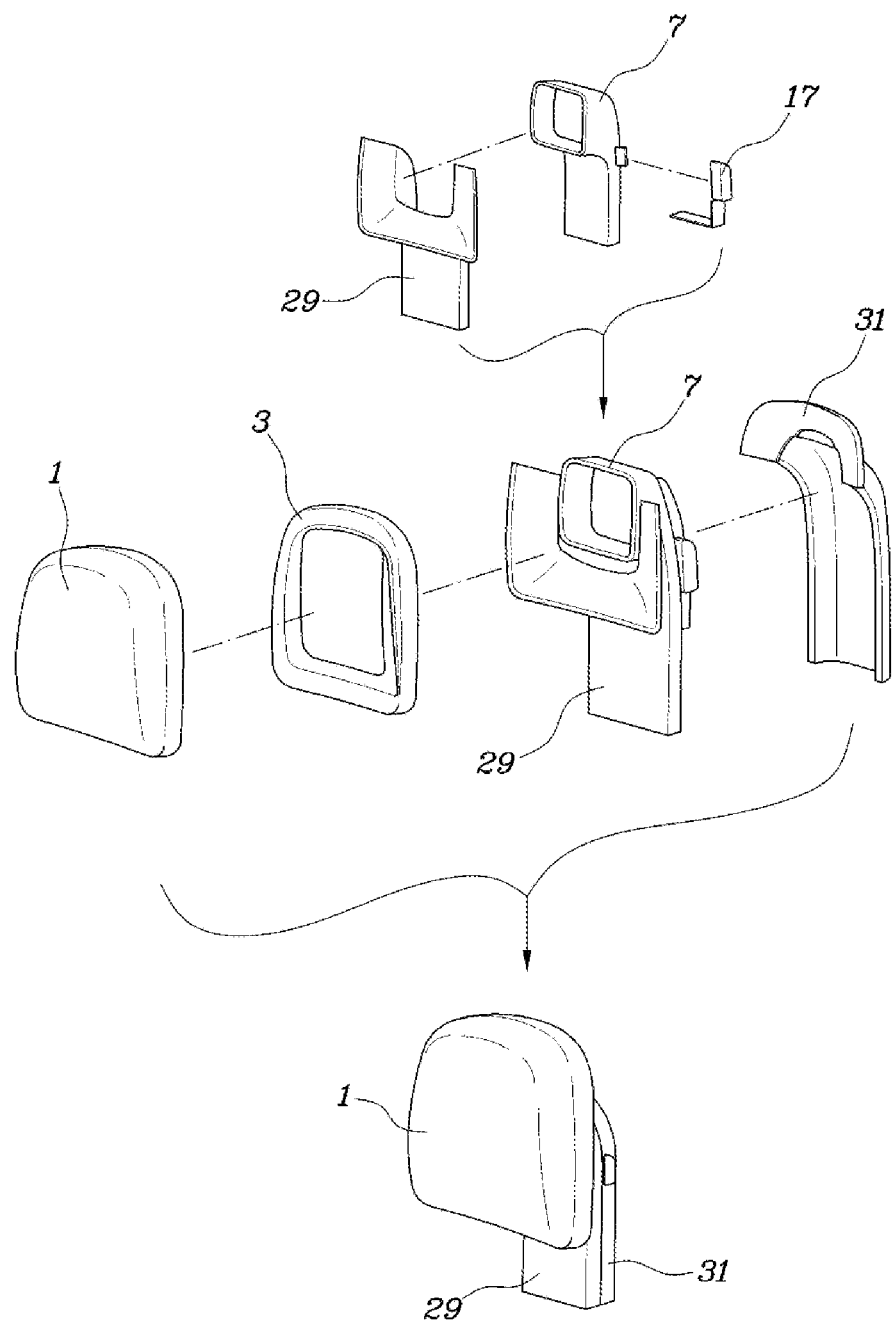
FIG. 2 is a view for explaining a configuration of a driving portion of a seat headrest of the present disclosure, the driving portion being a portion that can move upward/downward.
Figure 3:
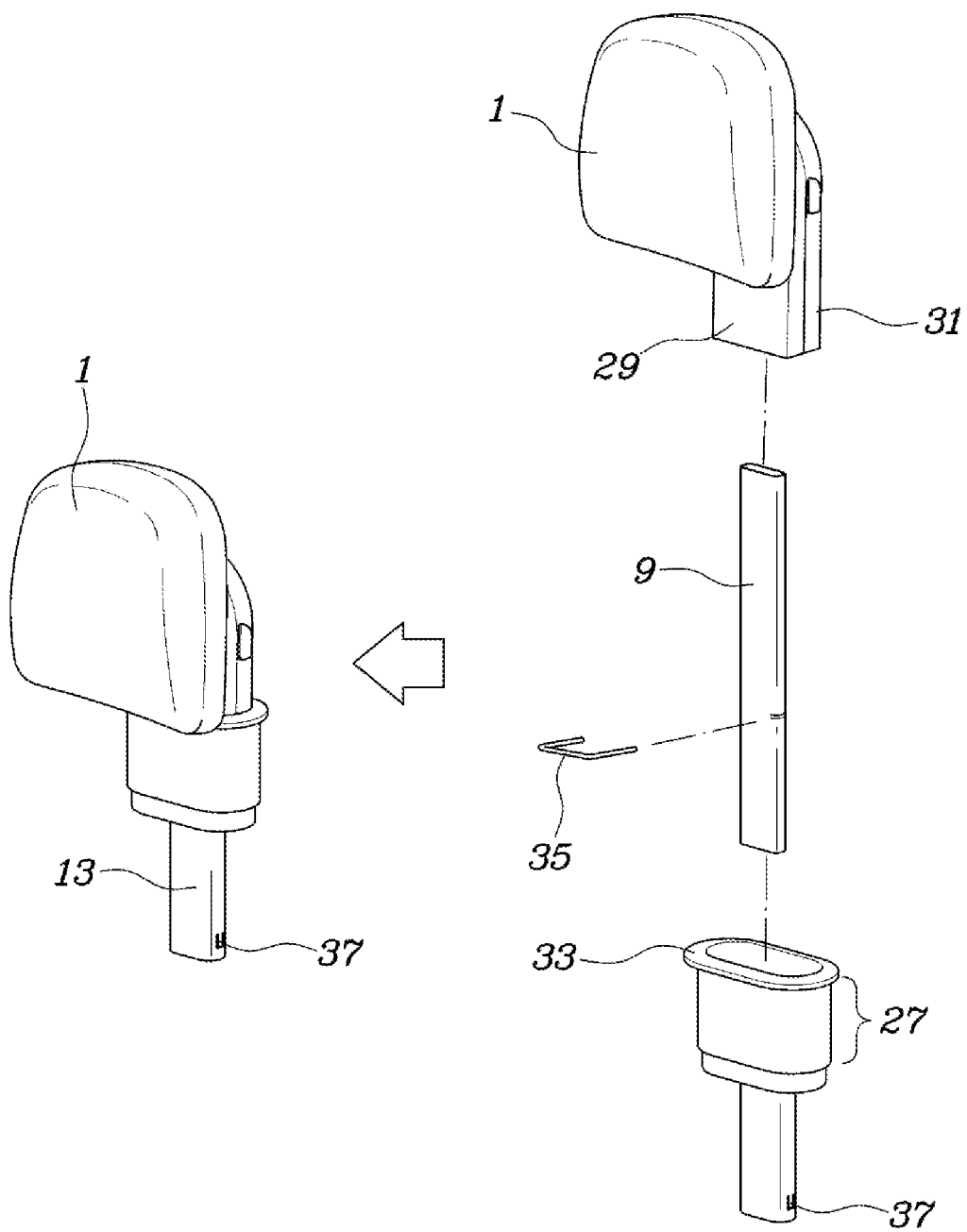
FIG. 3 is a view for explaining a coupling structure between a driving portion and a holding portion of FIG. 2.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A specific structural or functional description of embodiments of the present disclosure disclosed in the specification or application is provided merely for the purpose of describing the exemplary embodiment according to an exemplary embodiment of the present disclosure. Therefore, the exemplary embodiments according to an exemplary embodiment of the present disclosure may be implemented in various forms, and the present disclosure should not be construed as being limited to the exemplary embodiments described in the specification or application.

Various changes and modifications may be made to the exemplary embodiments according to an exemplary embodiment of the present disclosure, and therefore various exemplary embodiments will be illustrated in the drawings and described in the specification or application. However, it should be understood that embodiments according to the concept of the present disclosure are not limited to the particular disclosed exemplary embodiments of the present disclosure, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, various exemplary embodiments of the present disclosure will be described in detail with reference to the accompanying drawings. The same or like reference signs presented in the drawings designate the same or like elements.

Referring to FIG. 1 to FIG. 10, a seat headrest of the present disclosure includes: a pad assembly 1; a main cover 3 configured to surround the rear side of the pad assembly 1; an upper guide 7 coupled to the main cover 3 and provided with an upward/downward movement guide groove 5 formed therein and elongated upward/downward; a post stay 9, the upper portion of which is inserted in the upward/downward movement guide groove 5; and a post holding guide 13, in which the lower portion of the post stay 9 is inserted and held and which is held to a seat back frame 11.

That is, according to an exemplary embodiment of the present disclosure, the pad assembly 1, the main cover 3, the upper guide 7, and the like are configured to be able to move upward/downward along the post stay 9 held to the post holding guide 13.

For reference, the seat back frame 11 illustrated in the drawing shows substantially only a portion of an entire seat back frame forming the frame of a seat back 2.

Here, the pad assembly 1 is a part for substantially supporting the rear of the head of a user and thus, in consideration of safety and comfort and the external appearance thereof, is formed of appropriate internal materials, external materials, and the like. The main cover 3 and the upper guide 7 may be made of a plastic injected product, etc. Furthermore, the post stay 9 is substantially configured as a rail which enables the upper guide 7 and the pad assembly 1 to move upward/downward, and is thus formed of a metal tube having strong rigidity and the like.

A plurality of notch grooves 15 is formed through the post stay 9 in an upward/downward direction. Furthermore, the upper guide 7 is provided with a locking mechanism which is inserted into the notch grooves 15 such that a state in which the position of the upper guide 7 is held with respect to the post stay 9 may be varied.

The locking mechanism includes: a lock plate bezel 17 slidably provided in the upper guide 7 in a direction perpendicular to the longitudinal direction of the post stay 9; a lock plate 19 coupled to the lock plate bezel 17 and inserted into the notch grooves 15 of the post stay 9; a spring 21 provided to apply elastic force to the lock plate bezel 17 in a direction in which the lock plate 19 is inserted into the notch grooves 15; and a release button 23 provided on the upper guide 7 such that the displacement in a direction in which the lock plate 19 is separated from the notch grooves 15 is transferred to the lock plate bezel 17 when a user operates.

Figure 5:
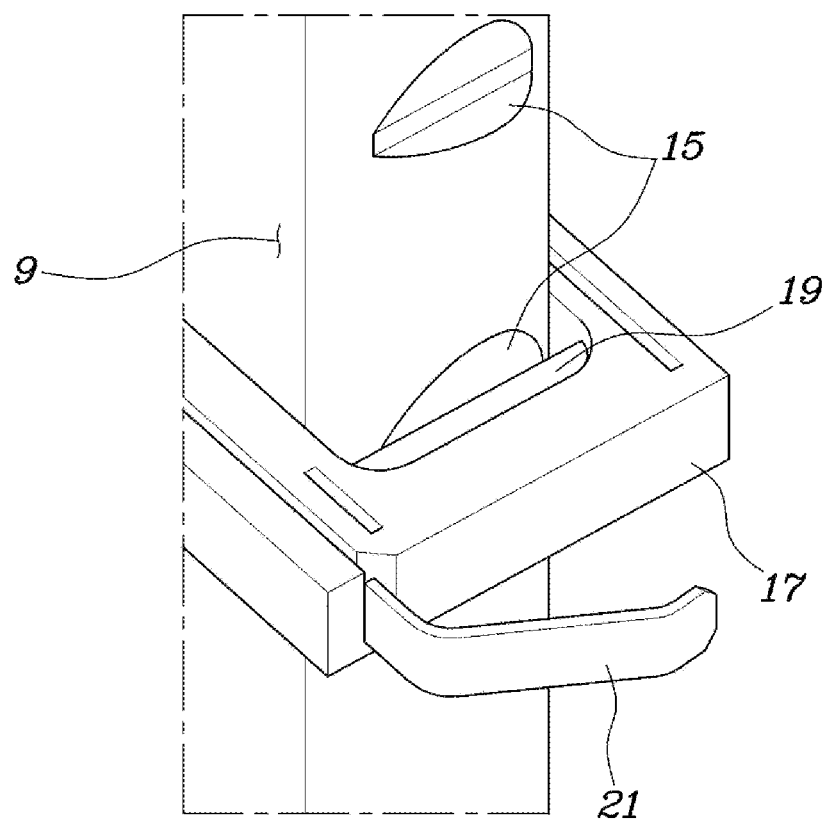
FIG. 5 is a view exemplarily illustrating a locking state in which a locking mechanism of a seat headrest of the present disclosure holds an upper guide to a post stay.
Figure 7:
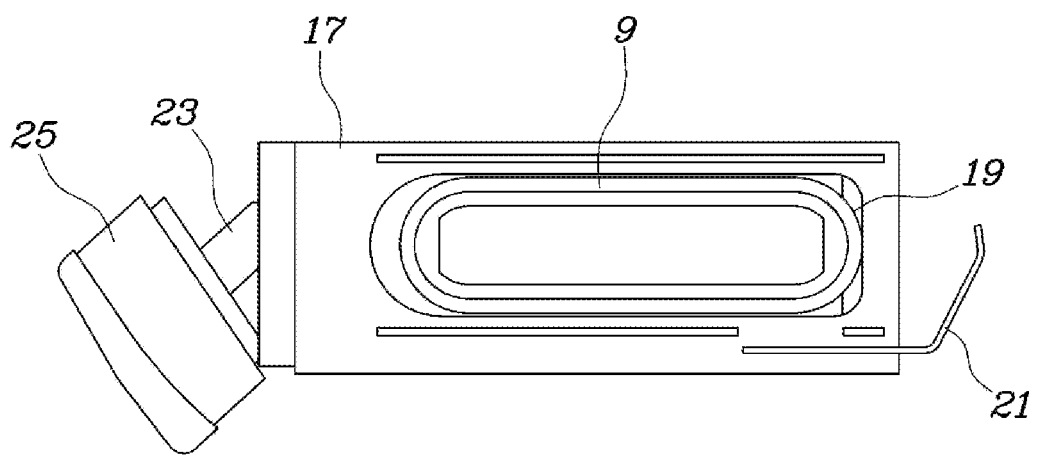
FIG. 7 is a view showing a state of FIG. 5 as a cross section perpendicular to the post stay.

Accordingly, in a state where the release button 23 is not pushed, as illustrated in FIG. 5 and FIG. 7, the lock plate 19 maintains a state of being inserted into the notch grooves 15 so that the upward/downward movement of the upper guide 7 with respect to the post stay 9 is restrained and thus a stable held state thereof may be secured.

Figure 6:
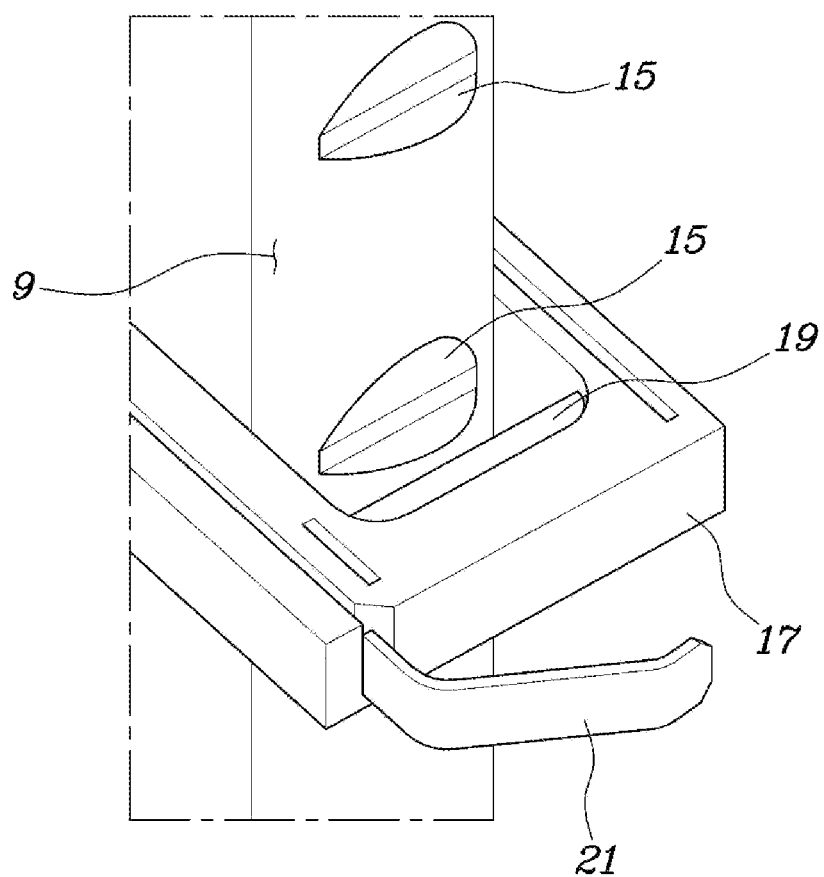
FIG. 6 is a view exemplarily illustrating a releasing state in which a locking state of FIG. 5 is released.
Figure 8:
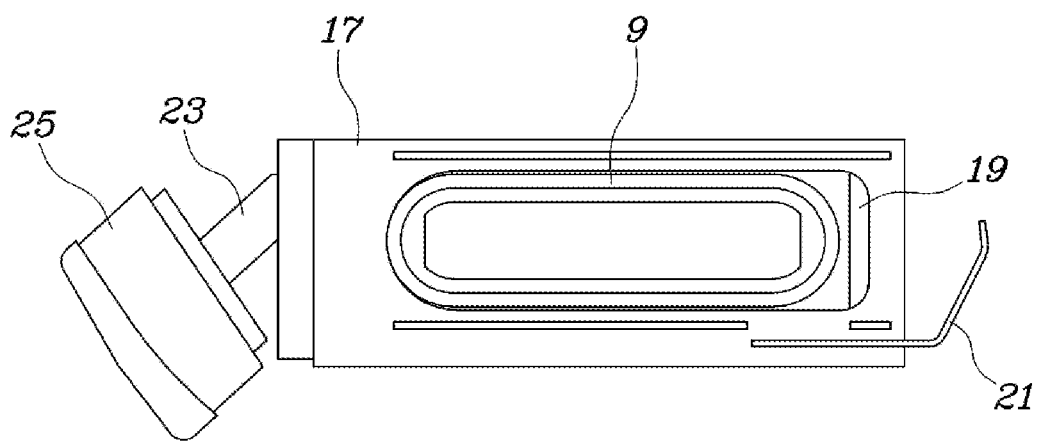
FIG. 8 is a view showing a state of FIG. 6 as a cross section perpendicular to the post stay.

Furthermore, in a state where the release button 23 is pushed, as illustrated in FIG. 6 and FIG. 8, the state of the lock plate 19 is a state of being separated from the notch grooves 15 so that the upper guide 7 can move up and down with respect to the post stay 9.

Figure 10:
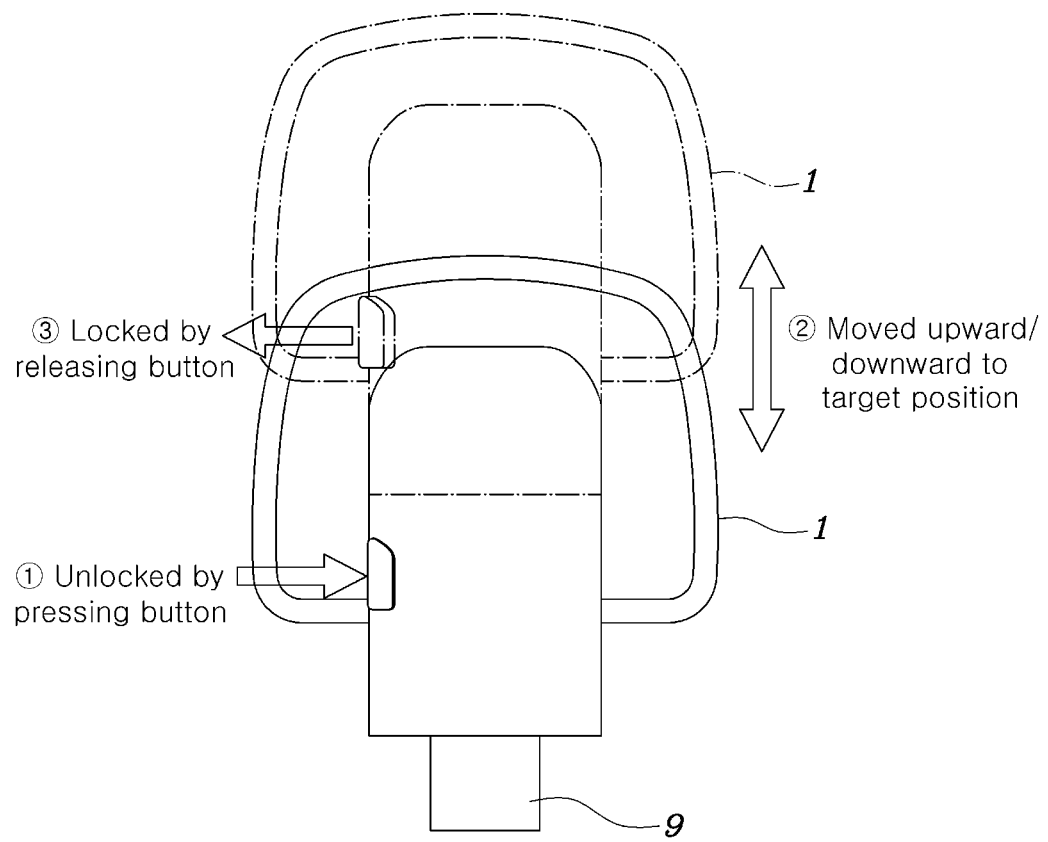
FIG. 10 is a view for explaining a height adjustment of a driving portion by use of a locking mechanism.

Accordingly, as illustrated in FIG. 10, in a state where a user pushes the release button 23, when the user adjusts a position of the upper guide 7 to a desired height and then releases the release button 23, the lock plate 19 is inserted into a notch groove 15 corresponding to the position so that the upper guide 7 and the pad assembly 1 is held to the position.

The lock plate 19 may be made of different types of material having rigidity stronger than the lock plate bezel 17 and be held to the lock plate bezel 17.

Namely, the lock plate 19 is directly inserted into the notch grooves 15 of the post stay 9, and may are configured to support a load in the upward/downward direction of the upper guide 7 and the pad assembly 1 and secure strong durability even in repeatedly forming unlocking and locking states. Therefore, when being used, in an aspect of cost and the like, it may be preferable that the lock plate is held to the lock plate bezel 17 after forming by use of a relatively strong material such as metal.

Naturally, the lock plate bezel 17 and the lock plate 19 may not be formed as separate components, but may be formed as an integral component made of a metallic material.

Figure 9:
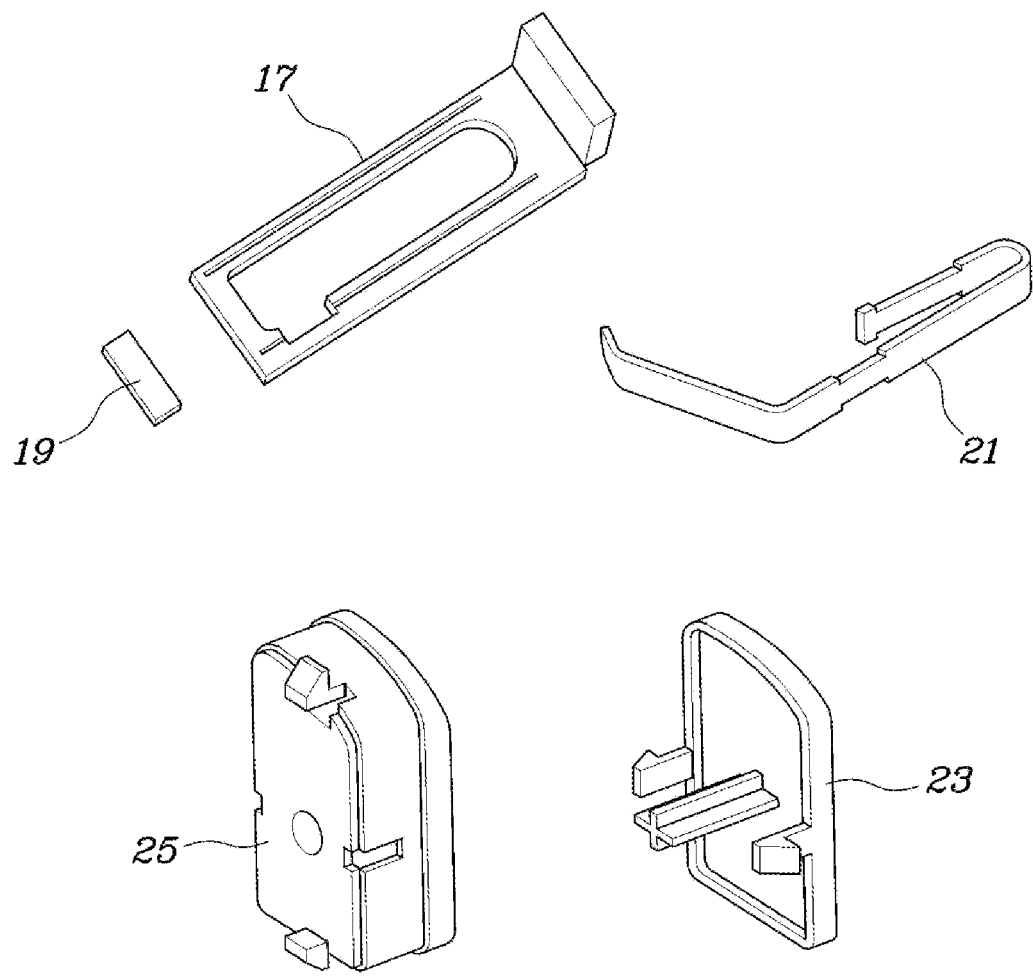
FIG. 9 is a disassembled view of components forming a locking mechanism.

For reference, FIG. 9 lists and illustrates components forming the locking mechanism, and a button bezel 25 is a component supporting such that the release button is slidably inserted.

A garnish is provided outside the upper guide 7 to surround the upper guide 7, and the lower end portion of the garnish is inserted in a lower guide portion 27 formed on an upper portion of the post holding guide 13 and is configured to guide an upward/downward movement thereof.

According to an exemplary embodiment of the present disclosure, the garnish includes a front garnish 29 configured to surround the front side of the upper guide 7 and a rear garnish 31 configured to surround the rear side of the upper guide 7.

Naturally, differently from the exemplary embodiment of the present disclosure, it may be possible to configure the garnish including a left garnish and a right garnish which surround the left side and the right side of the upper guide 7, respectively.

Here, the pad assembly 1, the main cover 3, the front garnish 29, and the rear garnish 31 move upward/downward substantially together when the upper guide 7 moves upward/downward and may be thus referred to as a "driving part". Furthermore, the post stay 9 and the post holding guide 13 are held to the seat back frame 11 and may be thus referred to as a "holding part".

The garnish structure like the above surrounds the upper guide 7 and thus enables a beautiful external appearance thereof. Furthermore, when the driving portion moves upward/downward with respect to the holding portion and the upper guide 7 is guided by the post stay 9, the surfaces of the front garnish 29 and the rear garnish 31 are inserted in the lower guide portion 27 of the post holding guide and are guided together, to implement a double-guide structure. Therefore, when the driving portion like the above moves upward/downward, a smooth and delicate upward/downward operation may be implemented without an occurrence of movement.

Furthermore, a top flange 33 is integrally formed on the upper end portion of lower guide portion 27 of the post holding guide 13 to beautify the appearance of the upper end portion of the seat back.

That is, the top flange 33 may perform a role of beautifully surrounding the edge portion of a hole which is provided on an upper side surface of the seat back so that the post holding guide 13 is inserted thereinto.

The post stay 9 is configured to be held, when inserted into the post holding guide 13, in a direction perpendicular to the longitudinal direction of the post stay 9 by the post holding guide 13 and an omega spring 35 inserted into the post stay 9.

Namely, in the state in which the lower portion of the post stay 9 is inserted in the post holding guide 13, it is configured to simply hold the post stay 9 to the post holding guide 13 by only coupling the omega spring 35 thereto.

Furthermore, a locking hook 37 is integrally provided at the lower portion of the post holding guide 13 and holds the post holding guide 13 to the seat back frame 11 while being restored after elastic deformation when the post holding guide 13 is inserted in the seat back frame 11.

Figure 4:
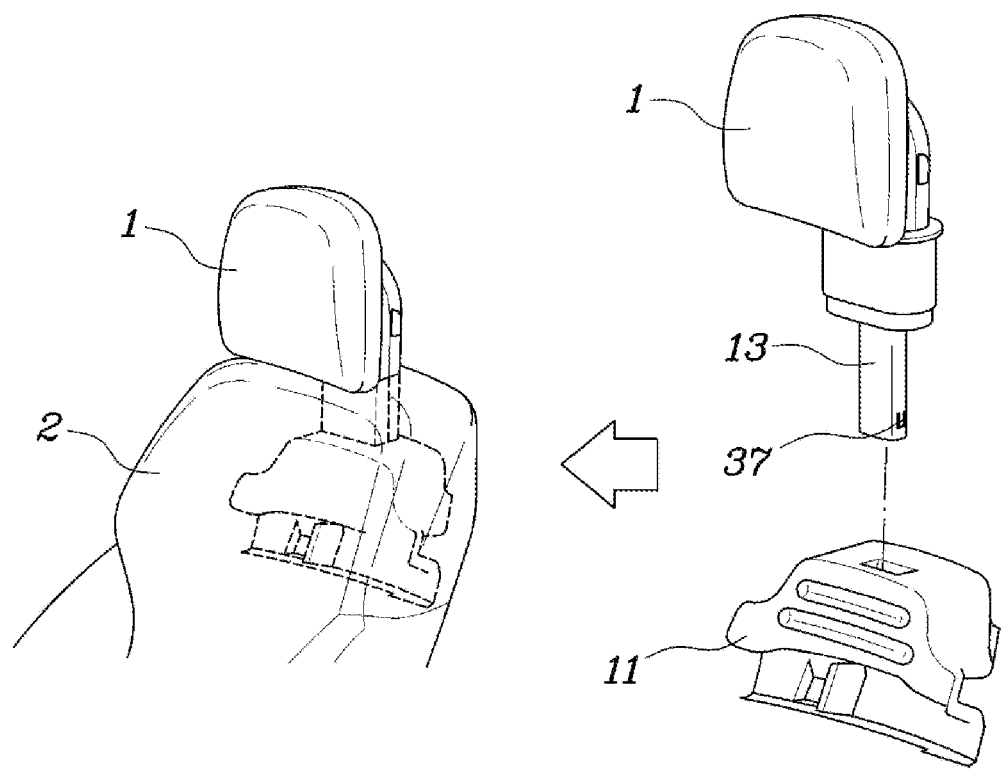
FIG. 4 is a view for explaining a process in which a driving portion and a holding portion of FIG. 2 and FIG. 3 are coupled to a seat back.

That is, in a state where the driving portion and the holding portion are assembled together, as illustrated in FIG. 4, the seat headrest of the present disclosure is configured such that the locking hook 37 of the post holding guide 13 is held to the seat back frame 11 while a lower holding portion of the assembly is inserted in the seat back from the upper side to the lower side thereof, and thus enables securing of simple and easy assemblability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A seat headrest apparatus comprising:
a pad assembly;
a main cover surrounding a rear side of the pad assembly;
an upper guide coupled to the main cover and provided with an upward/downward movement guide groove formed in the upper guide and elongated upward/downward;
a post stay including an upper portion inserted into the upward/downward movement guide groove; and
a post holding guide which is held to a seat back frame, and in which a lower portion of the post stay is inserted and held,
wherein a garnish is provided outside the upper guide to surround the upper guide, and
wherein a lower end portion of the garnish is inserted in a lower guide portion formed on an upper portion of the post holding guide and is configured to guide an upward/downward movement thereof.

2. The seat headrest apparatus of claim 1,
wherein a plurality of notch grooves is formed through the post stay in an upward/downward direction of the post stay, and
wherein the upper guide is provided with a locking mechanism which is inserted into the notch grooves so that a state in which a position of the upper guide is held with respect to the post stay is configured to vary.

3. The seat headrest apparatus of claim 2, wherein the locking mechanism includes:
a lock plate bezel slidably provided in the upper guide in a direction perpendicular to a longitudinal direction of the post stay;
a lock plate coupled to the lock plate bezel and configured to be selectively inserted into one of the notch grooves of the post stay;
a spring provided to apply elastic force to the lock plate bezel in a direction in which the lock plate is inserted into the one of the notch grooves; and
a release button provided on the upper guide so that a displacement in a direction in which the lock plate is separated from the one of the notch grooves is transferred to the lock plate bezel in response to a user's operation thereof.

4. The seat headrest apparatus of claim 3, wherein the lock plate is made of different material having rigidity stronger than the lock plate bezel and is held to the lock plate bezel.

5. The seat headrest apparatus of claim 3, wherein
when the release button is pushed, the lock plate bezel overcomes elastic force of the spring by the displacement transferred from the release button and thus moves, the lock plate is separated from the one of the notch grooves in the post stay, and a locking state thereof is thus released to enable the upper guide to move to a target position; and
when the release button is released after the upper guide is moved to the target position, the lock plate bezel returns to an original position thereof by elastic force of the spring, and the lock plate is thus stably inserted and locked into the one of the notch grooves.

6. The seat headrest apparatus of claim 1, wherein the garnish includes:
a front garnish surrounding a front side of the upper guide; and
a rear garnish surrounding a rear side of the upper guide.

7. The seat headrest apparatus of claim 1, wherein a top flange is integrally formed on an upper end portion of the lower guide portion of the post holding guide.

8. The seat headrest apparatus of claim 1, further including an omega spring inserted into the post stay,
wherein the post stay is configured to be held, when inserted into the post holding guide, by the post holding guide and the omega spring inserted into the post stay in a direction perpendicular to a longitudinal direction of the post stay.

9. The seat headrest apparatus of claim 1, further including a locking hook integrally provided at a lower portion of the post holding guide,
wherein the locking hook holds the post holding guide to the seat back frame while being restored after elastic deformation when the post holding guide is inserted in the seat back frame.

* * * * *